United States Patent
Ma

(10) Patent No.: US 8,165,720 B2
(45) Date of Patent: Apr. 24, 2012

(54) AUTOMATIC ENVIRONMENTAL ADJUSTMENT SYSTEM

(75) Inventor: Xian-Wei Ma, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 246 days.

(21) Appl. No.: 12/690,931

(22) Filed: Jan. 21, 2010

(65) Prior Publication Data

US 2011/0054697 A1    Mar. 3, 2011

(30) Foreign Application Priority Data

Aug. 28, 2009   (CN) .......................... 2009 1 0306291

(51) Int. Cl.
   *G05B 13/00* (2006.01)

(52) U.S. Cl. ....................................... 700/276; 700/295

(58) Field of Classification Search ................... 700/276
   See application file for complete search history.

(56) References Cited

U.S. PATENT DOCUMENTS

| | | | | |
|---|---|---|---|---|
| 4,199,102 | A * | 4/1980 | Paul ............................ | 236/91 G |
| 6,209,794 | B1 * | 4/2001 | Webster et al. ................ | 236/94 |
| 7,610,910 | B2 * | 11/2009 | Ahmed ........................ | 126/595 |
| 2002/0016639 | A1 * | 2/2002 | Smith et al. ................... | 700/9 |
| 2008/0015740 | A1 * | 1/2008 | Osann ........................... | 700/276 |
| 2008/0161976 | A1 * | 7/2008 | Stanimirovic ................. | 700/276 |
| 2008/0281472 | A1 * | 11/2008 | Podgorny et al. ............. | 700/276 |
| 2009/0281667 | A1 * | 11/2009 | Masui et al. .................. | 700/276 |
| 2011/0010014 | A1 * | 1/2011 | Oexman et al. ............... | 700/276 |

* cited by examiner

*Primary Examiner* — Albert Decady
*Assistant Examiner* — Anthony Whittington
(74) *Attorney, Agent, or Firm* — Altis Law Group, Inc.

(57) ABSTRACT

A system automatically adjusts environmental condition by detecting an environment value and controlling a window blinds and an environmental regulator according to a comparison between the environment value and a predetermined environment value.

17 Claims, 4 Drawing Sheets

AUTOMATIC ENVIRONMENTAL ADJUSTMENT SYSTEM

BACKGROUND

1. Technical Field

The disclosure relates to adjustment systems, and particularly, to window blinds adjustment system that automatically responds to changing environmental conditions.

2. Description of Related Art

To achieve comfortable interior home or office environmental conditions, most window shadings/blinds and electrical environmental regulating devices, such as, light bulbs, air conditioners, and humidifiers, are manually adjusted. This is an inconvenience.

Therefore, a system which can overcome the above-mentioned limitations is needed.

BRIEF DESCRIPTION OF THE FIGURE

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
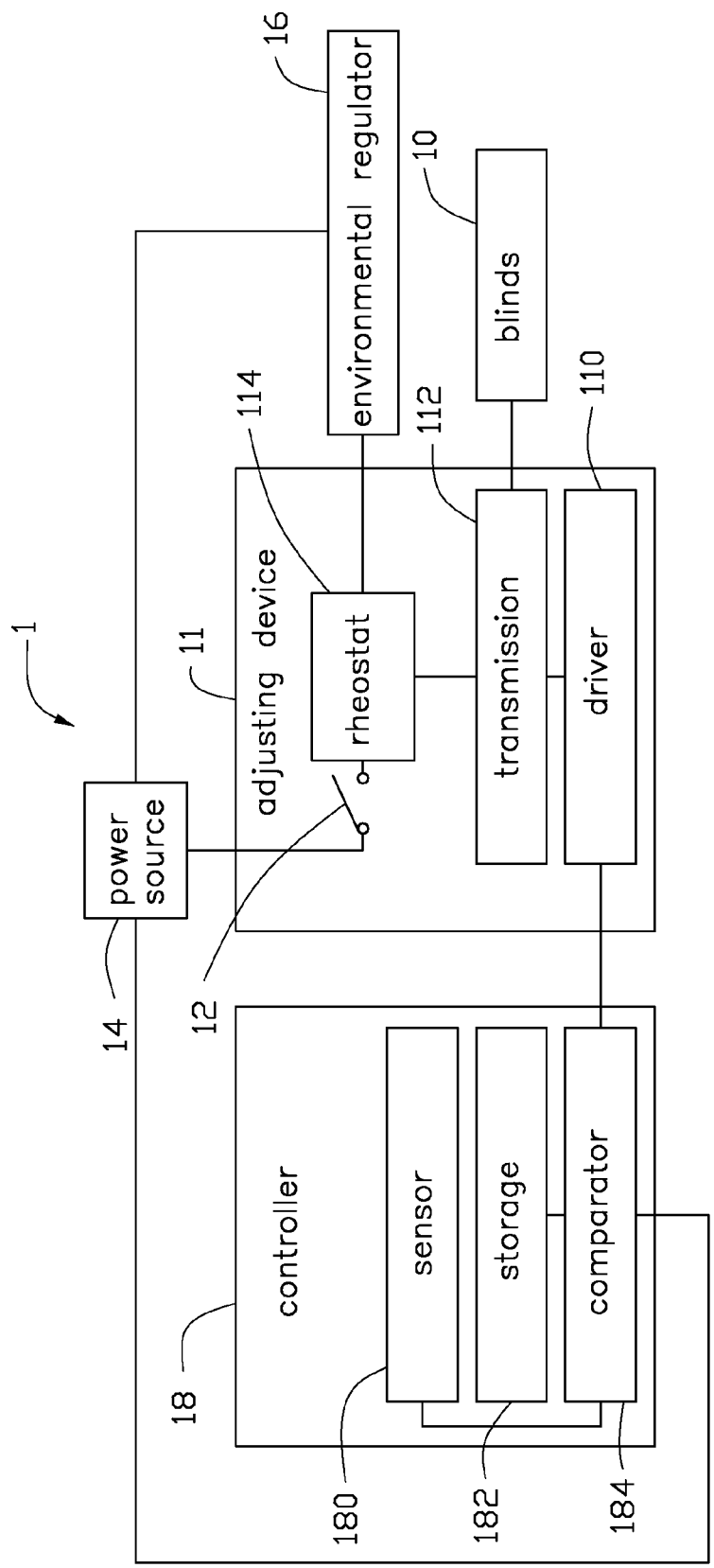
FIG. 1 is a block diagram showing an exemplary embodiment of an automatic environmental adjustment system.

Referring to FIG. 1, an adjustment system 1, according to an exemplary embodiment, is illustrated. The adjustment system 1 is configured for automatically adjusting the ambient environment by controlling a window blinds 10 and the power supplied from a power source 14 (e.g., the local power supply) to an environmental regulator 16. The adjustment system 1 includes a controller 18, an adjusting device 11 and a switch 12.

The controller 18 is configured for generating a control signal based on the current interior environment and a predetermined environment value. The controller 18 includes a sensor 180, a storage 182, and a comparator 184.

The sensor 180 is configured for detecting an interior environment value and/or an exterior environment value. In this embodiment, the sensor 180 can be a brightness sensor, a temperature sensor, or a humidity sensor, or one sensor capable of detecting brightness, temperature, and humidity.

The storage 182 is configured for storing a predetermined environment value, for example: a brightness value, a temperature value or a humidity value or all three values.

The comparator 184 is connected to the sensor 180 and the storage 182. The comparator 184 is configured for comparing the interior environment value detected by the sensor 180 with the predetermined environment value and the exterior environment value to generate a number of control signals to the adjusting device 11 accordingly.

The control signal can be, for example, an increasing signal, a decreasing signal, a startup signal, and a shutdown signal. The comparator 184 generates the increasing signal when the interior environment value is below the predetermined environment value, generates the decreasing signal when the interior environment value is above the predetermined environment value, generates the startup signal when the adjustment system 1 need to use the exterior condition to adjusts the interior environment, and generates the shutdown signal when the adjustment system 1 need to prevent the exterior condition from influencing the interior environment.

The adjusting device 11 includes a driver 110, a transmission 112, and a rheostat 114. The driver 110 is connected to the comparator 184 and configured for adjusting the window blinds 10 through cooperation with the transmission 112, based on the control signal. The rheostat 114 is interconnected between the environmental regulator 16 and power source 14 and is configured for controlling power supply from the power source 14 to the environmental regulator 16 by adjusting the resistance thereof. The rheostat 114 is coupled to the transmission 112 for adjusting the resistance based on the rotated angle of the transmission 112.

Figure 2:
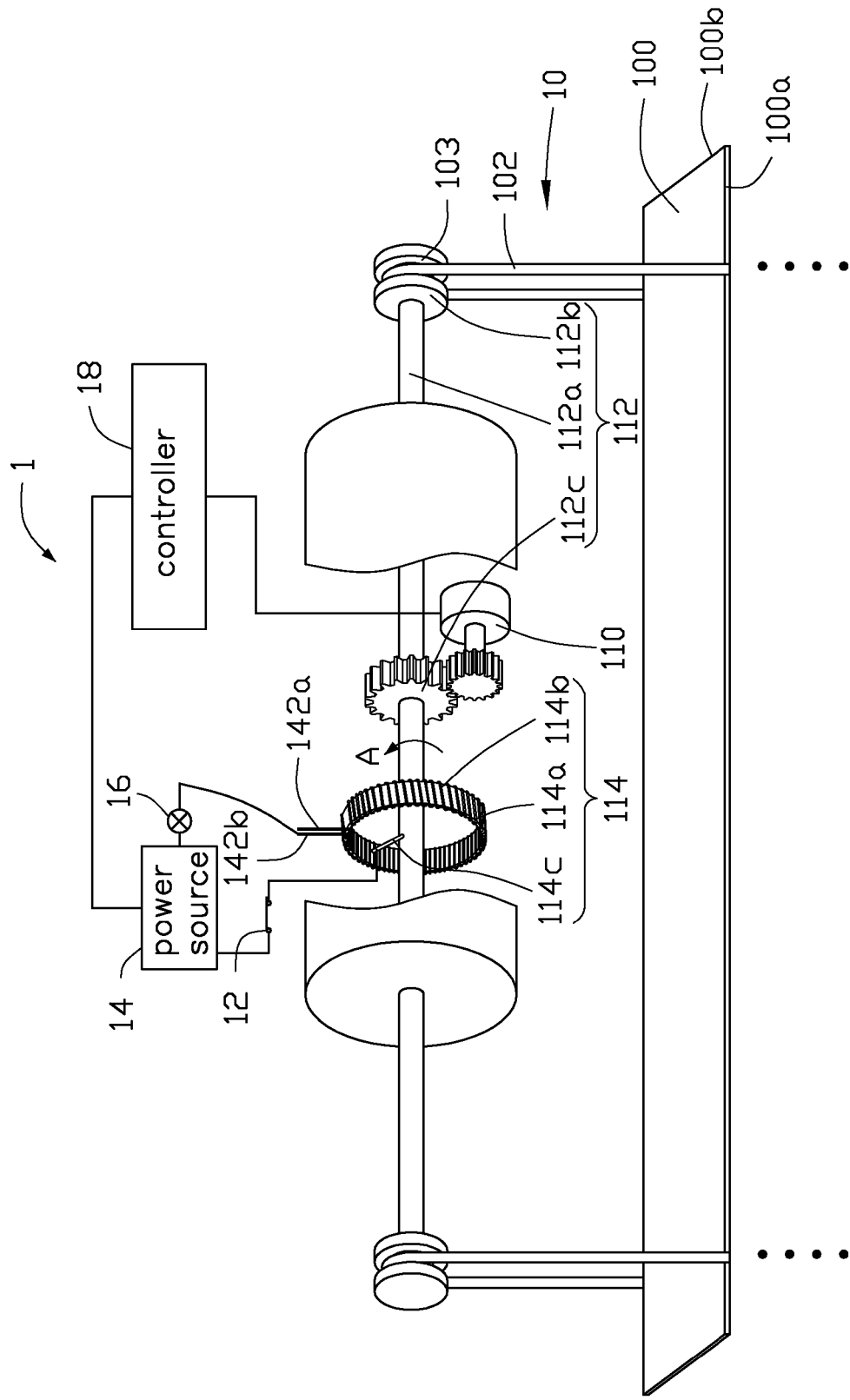
FIG. 2 is a schematic view showing an adjusting device of the automatic environmental adjustment system of FIG. 1, which is in a first state for adjusting interior brightness.
Figure 3:
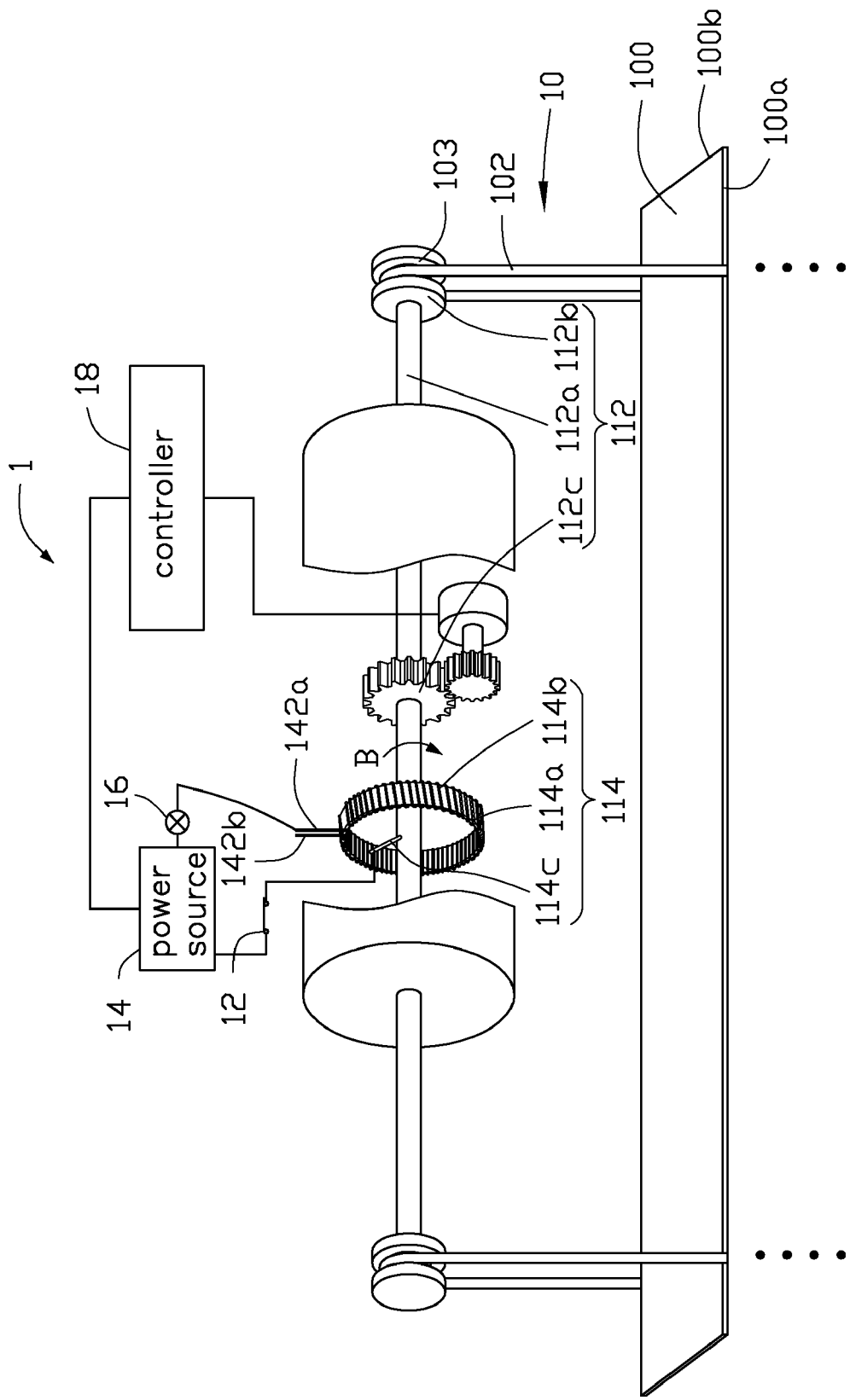
FIG. 3 is a schematic view showing the adjusting device of the automatic environmental adjustment system of FIG. 1, which is in a second state for adjusting interior brightness.

Referring to FIGS. 2 and 3, the transmission 112 includes a transmission shaft 112a, a pair of rollers 112b, and a gear 112c. The rollers 112b are correspondingly fixed on two opposite ends of the transmission shaft 112a. Each roller 112b is substantially cylindrical and defines a receiving groove 113 around the peripheral surface of the roller 112b.

The gear 112c is coaxially fixed to the transmission shaft 112a. The driver 110 is coupled to the gear 112c (e.g., a rotor thereof meshing with the gear 112c) for driving the transmission shaft 112a to rotate. The controller 18 connects to the driver 110 to control the rotational direction of the transmission shaft 112a.

The rheostat 114 is substantially ring-shaped and includes a circular ring 114a, a resistance wire 114b, and a contacting rod 114c. The circular ring 114a is coaxial with the transmission shaft 112a. The resistance wire 114b is wound around the circular ring 114a and includes a first output end 142a and a second output end 142b. The contacting rod 114c radially extends from the peripheral surface of the transmission shaft 112a at a position corresponding to the circular ring 114a. A distal end of the contacting rod 114c slidingly contacts the resistance wire 114b.

The switch 12 is configured for interconnecting the power source and the adjusting device 11. The power source 14 can be a direct current source or an alternating current source. The environmental regulator 16 is configured for regulating the interior environment. In this embodiment, the environmental regulator 16 can be a light source, an air condition, or a humidifier.

The window blinds 10 includes a number of parallel slats 100 (only one shown in the figures) and a pair of transmission belts 102. The slat 100 is an elongate rectangular plate and includes a pair of long sides 100a and a pair of short sides 100b.

The long sides 100a of each slat 100 are correspondingly connected to the transmission belts 102. The tilt angle of the slats 100 can be changed when the transmission belts 102 are driven to move upward or downward by the rollers 112b.

It is noteworthy that the light/air admittance of the window blinds 10 approaches its maximum when the slats 100 tilt 90 degrees to the vertical direction, and the minimum (almost zero) when the tilting angle of the slats falls to about zero.

In assembly, the transmission belts 102 are correspondingly engaged on the receiving grooves 113 of the rollers 112b. The comparator 184 of the controller 18 is connected to the driver 110. The second output end 142b of the resistance wire 114b is connected to the environmental regulator 16 when the transmission shaft 112a rotates in a direction A (as shown in FIG. 2) to decrease the light/air admittance of the window blinds 10. The first output end 142a is connected to the environmental regulator 16 when the transmission shaft 112a rotates in a direction B (as shown in FIG. 3) to decrease the light/air admittance of the window blinds 10.

In use, when the adjustment system 1 is configured for adjusting the interior brightness, the sensor 180 is configured for detecting the interior brightness value. The environmental regulator 16 can be the light source, for example: an incandescent bulb or a light emitting diode (LED). The switch 12 is turned on to interconnect the power source 14 and the contacting rod 144c. The sensor 180 detects the interior brightness value. The comparator 184 compares the interior brightness value with the predetermined brightness value. If the interior brightness value is below the predetermined brightness value, the comparator 184 transmits the increasing signal to the driver 110. The driver 110 drives the transmission shaft 112a to rotate in the direction increasing the light admittance of the window blinds 10. The contacting rod 114c rotates with the transmission shaft 112a to increase the power of the light source. The brightness of the light source increases with the power thereof. Therefore, the total interior brightness increases with the increment of the light admittance of the window blinds 10 and the brightness of the light source.

If the interior brightness value is above the predetermined brightness value, the comparator 184 transmits the decreasing signal to the driver 110. The driver drives the transmission shaft 112a to rotate in the direction decreasing the light admittance of the window blinds 10. The contacting rod 114c rotates with the transmission shaft 112a to decreases the power of the light source. The brightness of the light source decreases with the power thereof. Therefore, the total interior brightness decreases with the decrement of the light admittance of the window blinds 10 and the brightness of the light source.

Figure 4:
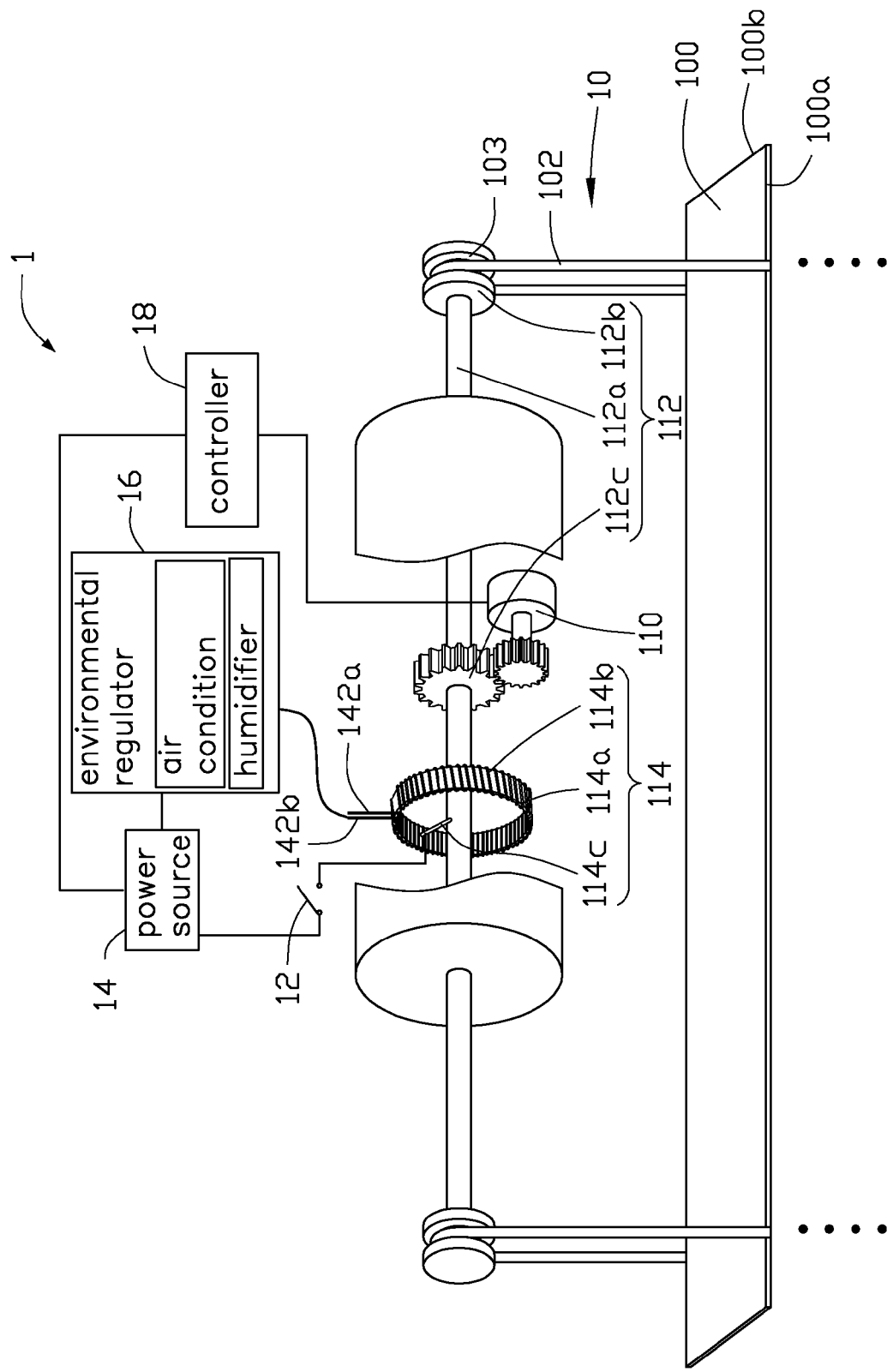
FIG. 4 is a schematic view showing the adjusting device of the automatic environmental adjustment system of FIG. 1, which is configured for adjusting interior temperature and/or humidity.

Referring to FIG. 4, when the adjustment system 1 is configured for adjusting the interior temperature or humidity, the sensor 180 is configured for detecting the temperature or humidity. The environmental regulator 16 can be the air condition or the humidifier. The switch 12 is turned off to break the connection between the power source 14 and the contacting rod 144c. The sensor 180 detects the interior temperature/humidity value and the exterior temperature/humidity value. The comparator 184 compares the interior temperature/humidity value with the predetermined temperature/humidity value. If the interior temperature/humidity value is below the predetermined temperature/humidity value, the comparator 184 transmits the increasing signal to the air condition or the humidifier to increases the interior temperature/humidity. If the interior temperature/humidity value is above the predetermined temperature/humidity value, the comparator 184 transmits the decreasing signal to the air condition or the humidifier to decrease the interior temperature/humidity.

At the same time, the comparator 184 compares the interior temperature/humidity value with the exterior temperature/humidity value. If the interior temperature/humidity is below both the predetermined temperature/humidity and the exterior temperature/humidity, or above both the predetermined temperature/humidity and the exterior temperature/humidity, the comparator 184 transmits the startup signal to the driver 110 to open the window blinds 10. As thus, the adjustment system 1 can use the exterior condition to adjust the interior environment.

If the interior temperature/humidity is below the predetermined temperature/humidity value but above the exterior temperature/humidity value, or above the predetermined temperature/humidity value but below the exterior temperature/humidity value, the comparator transmits the shutdown signal to the driver 110 to close the window blinds 10. Accordingly, the adjustment system 1 can prevent the exterior conditions from influencing the interior ambient environment.

While various exemplary and preferred embodiments have been described, it is to be understood that the disclosure is not limited thereto. To the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. A system for adjusting environmental condition by controlling a window blind and the output of an environmental regulator, a power source connects to the environmental regulator for supplying power, the system comprising:

a controller for detecting an interior environment value and an exterior environment value and generating a control signal according to a comparison between the interior environment value with a predetermined environment value and the exterior environment value; and an adjusting device comprises:
a transmission connected to the window blinds;
a driver connected to the controller and the transmission for adjusting the window blinds through cooperation with the transmission according to the control signal; and
a rheostat is interconnected between the environmental regulator and the power source through a switch and is configured for controlling power supplied from the power source to the environmental regulator by adjusting a resistance thereof, the rheostat is coupled to the transmission for adjusting the resistance based on the rotated angle of the transmission.

2. The system as claimed in claim 1, wherein the transmission comprises a transmission shaft, a pair of rollers, and a gear, each roller is substantially cylindrical and defines a receiving groove around the periphery of the roller, the rollers are correspondingly fixed on two opposite ends of the transmission shaft, the gear is coaxially fixed to the transmission shaft, the driver is coupled to the gear for driving the transmission shaft to rotate, the controller is connected to the driver for controlling the rotation direction of the transmission shaft.

3. The system as claimed in claim 2, wherein the window blinds comprises a plurality of parallel slats and a pair of transmission belts, the slat is an elongate rectangular plate and comprises a pair of long sides and a pair of short sides, the transmission belts are correspondingly engaged on the receiving groove, the long sides of each window blinds are correspondingly connected to the transmission belts, the tilt angle of the slats can be changed when the transmission belts are driven to move upward or downward by the rollers.

4. The system as claimed in claim 2, wherein the rheostat is substantially ring-shaped and comprises a circular ring, a resistance wire, and a contacting rod, the circular ring is coaxial with the transmission shaft, the resistance wire is wound around the circular ring, the contacting rod radially extends from the peripheral surface of the transmission shaft at a position corresponding to the circular ring, a distal end of the contacting rod slidingly contacts with the resistance wire.

5. The system as claimed in claim 2, wherein the power source can be a direct current source or an alternating current source.

6. The system as claimed in claim 2, wherein the controller comprises:
   a sensor for detecting the interior environment value and the exterior environment value;
   a storage for storing the predetermined environment value; and
   a comparator connected to the sensor, the storage, and the driver for comparing the interior environment value with the predetermined environment value and the exterior environment value and transmitting an increasing signal when the interior environment value is below the predetermined environment value or a decreasing signal when the interior environment value is above the predetermined environment value.

7. The system as claimed in claim 6, when the system is configured for adjusting the interior brightness, the sensor is configured for detecting an interior brightness value, the environmental regulator is a light source, the switch is turned on to interconnect the power source and the contacting rod.

8. The system as claimed in claim 7, wherein the driver drives the transmission shaft to rotate in a direction increasing the light admittance of the window blinds when receives the increasing signal transmitted from the comparator, the driver drives the transmission shaft to rotate in a direction decreasing the light admittance of the window blinds when receives the decreasing signal transmitted from the comparator.

9. The system as claimed in claim 8, wherein the resistance wire comprises a first output end and a second output end, the contacting rod is connected to the power source, the environmental regulator is connected to the first output end or the second output end to make the output power of the environmental regulator increase or decrease when the light admittance of the window blinds increases or decreases.

10. The system as claimed in claim 6, when the system is configured for adjusting the interior temperature, the sensor is configured for detecting an interior temperature value and an exterior temperature value, the predetermined environment value is a predetermined temperature value, the environmental regulator is an air condition, the switch is turned off to break the connection between the power source and the contacting rod.

11. The system as claimed in claim 10, wherein the comparator transmits the increasing signal to the air condition to increases the interior temperature if the interior temperature value is below the predetermined temperature value, the comparator transmits the decreasing signal to the air condition to decrease the interior temperature if the interior temperature value is below the predetermined temperature value.

12. The system as claimed in claim 10, wherein the comparator compares the interior temperature value with the exterior temperature value and transmits an startup signal to the driver to increase the air admittance of the window blinds if the interior temperature value is below both the predetermined temperature value and the exterior temperature value or above both the predetermined temperature value and the exterior temperature value.

13. The system as claimed in claim 10, wherein the comparator compares the interior temperature value with the exterior temperature value and transmits a shutdown signal to the driver to decrease the air admittance of the window blinds if the interior temperature value is below the predetermined temperature value but above the exterior temperature value, or above the predetermined temperature value but below the exterior temperature value.

14. The system as claimed in claim 6, when the system is configured for adjusting the interior humidity, the sensor is configured for detecting an interior humidity value and an exterior environment value, the predetermined environment value is a predetermined humidity value, the environmental regulator is a humidifier, the switch is turned off to break the connection between the power source and the contacting rod.

15. The system as claimed in claim 14, wherein the comparator transmits the increasing signal to the humidifier to increases the interior humidity if the interior humidity value is below the predetermined humidity value, the comparator transmits the decreasing signal to the humidifier to decrease the interior humidity if the interior humidity value is below the predetermined humidity value.

16. The system as claimed in claim 14, wherein the comparator compares the interior humidity value with the exterior humidity value and transmits a startup signal to the driver to increase the air admittance of the window blinds if the interior humidity value is below both the predetermined humidity value and the exterior humidity value or above both the predetermined humidity value and the exterior humidity value.

17. The system as claimed in claim 14, wherein the comparator compares the interior humidity value with exterior humidity value and transmits a shutdown signal to the driver to decrease the air admittance of the window blinds if the interior humidity value is below the predetermined humidity value but above the exterior humidity value, or above the predetermined humidity value but below the exterior humidity value.

* * * * *